(12) United States Patent
Rogers et al.

(10) Patent No.: US 8,216,345 B2
(45) Date of Patent: Jul. 10, 2012

(54) GASIFICATION APPARATUS AND METHOD

(75) Inventors: Jackie W. Rogers, Stamps, AR (US); Michael W. Rogers, Stamps, AR (US)

(73) Assignee: Verde Reformation, Inc., Stamps, AR (US)

( * ) Notice: Subject to any disclaimer, the term of this patent is extended or adjusted under 35 U.S.C. 154(b) by 772 days.

(21) Appl. No.: 12/082,428

(22) Filed: Apr. 10, 2008

(65) Prior Publication Data

US 2008/0250927 A1 Oct. 16, 2008

Related U.S. Application Data

(63) Continuation of application No. 11/487,643, filed on Jul. 17, 2006, which is a continuation-in-part of application No. 11/196,977, filed on Aug. 4, 2005, now abandoned, which is a continuation-in-part of application No. 10/911,386, filed on Aug. 4, 2004, now abandoned.

(60) Provisional application No. 60/492,363, filed on Aug. 4, 2003.

(51) Int. Cl.
| | |
|---|---|
| B01D 53/50 | (2006.01) |
| C10J 3/00 | (2006.01) |
| F23G 5/00 | (2006.01) |
| F23J 1/00 | (2006.01) |
| C01B 21/20 | (2006.01) |
| F04D 29/42 | (2006.01) |

(52) U.S. Cl. ............ 95/187; 48/111; 48/127.9; 110/259; 110/322; 110/204; 110/235; 110/309; 422/129; 422/616; 422/611; 422/225; 422/226; 422/227; 422/228; 422/229; 422/213; 422/650; 422/651

(58) Field of Classification Search .................... 95/187, 95/214; 96/189, 233; 55/385.1
See application file for complete search history.

(56) References Cited

U.S. PATENT DOCUMENTS

| | | | | |
|---|---|---|---|---|
| 2,464,473 | A * | 3/1949 | Wessel | 415/213.1 |
| 3,639,261 | A * | 2/1972 | Slater | 252/373 |
| 3,907,519 | A * | 9/1975 | Sieg et al. | 48/202 |
| 4,087,258 | A * | 5/1978 | Baron et al. | 48/197 R |
| 4,149,859 | A * | 4/1979 | Vigesdal | 95/200 |
| 4,237,780 | A * | 12/1980 | Truhan | 454/52 |
| 4,306,506 | A * | 12/1981 | Rotter | 110/229 |
| 4,659,340 | A * | 4/1987 | Weaver | 48/76 |
| 4,896,508 | A * | 1/1990 | Reinke, Jr. | 60/648 |
| 6,769,370 | B1 * | 8/2004 | Lee et al. | 110/259 |
| 7,301,060 | B2 * | 11/2007 | Appel et al. | 585/240 |
| 7,678,164 | B2 * | 3/2010 | Williams | 48/66 |
| 7,964,026 | B2 * | 6/2011 | Rogers | 95/187 |
| 2002/0146362 | A1 * | 10/2002 | Mcquigg et al. | 423/215.5 |
| 2005/0268556 | A1 * | 12/2005 | Rogers | 48/197 FM |
| 2006/0123706 | A1 * | 6/2006 | Wakefield et al. | 48/210 |
| 2006/0249021 | A1 * | 11/2006 | Rogers | 95/187 |

* cited by examiner

Primary Examiner — Duane Smith
Assistant Examiner — Ives Wu
(74) Attorney, Agent, or Firm — Harness, Dickey & Pierce, P.L.C.

(57) ABSTRACT

A gasification system is disclosed having a combustion or reaction vessel, a scrubber housing, and a filter housing. A carbonaceous fuel is partially combusted in the reaction vessel to generate a combustible gas. An improved ash support and removal system reduces clogging and other problems in the reaction vessel. The combustible gas passes through the scrubber housing to remove matter such as tar and oil, and the scrubbed gas passes through a hybrid blower to the filter housing. Wood chips are used in the filter housing to provide a relatively clean, dry gas. Wastewater and other waste products from the scrubber housing and filter housing are captured and returned to the reaction vessel.

7 Claims, 3 Drawing Sheets

GASIFICATION APPARATUS AND METHOD

CROSS-REFERENCE TO RELATED APPLICATIONS

This application is a continuation of U.S. patent application Ser. No. 11/487,643 filed Jul. 17, 2006, which is a continuation-in-part of Ser. No. 11/196,977 filed Aug. 4, 2005 now abandoned, which is a continuation-in-part of U.S. patent application Ser. No. 10/911,386 filed Aug. 4, 2004 now abandoned, which claims the benefit of U.S. Provisional Patent Application No. 60/492,363 filed Aug. 4, 2003. Each of the aforementioned related patent applications is herein incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates to a gasification apparatus that produces combustible fuel gases from a wide variety of carbonaceous fuel sources or combinations of fuel sources.

2. Brief Description of the Related Art

Gasification has generally been known for years. In gasification, a carbonaceous fuel source is partially combusted to produce a combustible gas, synthesis gas, or syngas. The combustible gas is then combusted to produce work. The combustible gases produced by gasification may find a variety of uses, including, but not limited to, supplying heat, powering a motor, or producing electricity. Gasification provides many advantages, such as allowing fuels having relatively low heating values to be used, allowing waste products to be used to produce work and, similarly, reducing the amount of waste material sent to landfills. Despite these obvious advantages, gasification has met with only limited success, because gasification systems have typically been plagued by a number of disadvantages or difficulties. For example, the heating values of gases produced using prior art systems have tended to fluctuate to an undesirable degree, particularly when a variety of fuel sources or fuel sources of varying compositions have been used. Similarly, it has also proven difficult to consistently produce gases having sufficiently high heating values. Separating particulate matter from the produced gas has proven problematic. Similarly, it has proven difficult to produce sufficiently clean gases having sufficiently low amounts of particulate matter as well as sufficiently low amounts of pollutants such as such as sulfur dioxide (SO2), nitrogen oxides (NO), carbon monoxide (CO), volatile organic compounds (VOC), ammonia (NH3), hydrogen chloride (HCI) and other chlorides. Environmentally sound disposal of wastewater generated by such systems has also presented difficulties. Further still, the presence of water or other liquids in the combustible gas has made it difficult or impossible to use blowers for moving the combustible gases without creating undesirable levels of wear and tear on the blowers.

BRIEF SUMMARY OF THE INVENTION

It is therefore an object of the present invention to provide a flexible gasification apparatus that provides combustible gases having high heating values while avoiding pitfalls of prior attempts .at gasification.

It is a further object of the present invention to provide an apparatus of the above type that can easily handle a wide variety of carbonaceous fuel sources or combinations of fuel sources.

It is a further object of the present invention to provide an apparatus of the above type that produces a high value heating gas having low amounts of particulate matter and other pollutants.

It is a further object of the present invention to provide an apparatus of the above type that requires little or no wastewater disposal.

It is a still further object of the present invention to provide an apparatus of the above type that captures a relatively high fraction of the potential heating value of the fuel sources.

It is a still further object of the present invention to provide an apparatus of the above type that safely and cleanly consumes a wide variety of agricultural and industrial byproducts, including, but not limited to, animal waste and wood pulp sludge.

It is a still further object of the present invention to provide an apparatus of the above type that is less prone to clogging problems typically associated with ash removal.

It is a still further object of the present invention to provide an apparatus of the above type that may easily process a wide variety of combinations of solid, semi-solid and liquid fuels.

It is a still further object of the present invention to provide an apparatus of the above type that can safely and efficiently handle and dry relatively wet combustible gases.

It is a still further object of the present invention to provide an apparatus of the above type that uses one or more rugged blowers that can safely and efficiently handle both dry and relatively wet combustible gases.

Toward the fulfillment of these and other objects and advantages, the system of the present invention comprises a combustor vessel, an optional scrubber vessel, an optional fixer vessel, an optional cyclone vessel, an optional demister vessel and one or more optional blowers. A carbonaceous fuel is partially combusted in the combustor to generate a combustible gas. An improved ash support and removal subsystem reduces clogging and other problems in the combustor. The combustible gas passes through one or more optional blowers to the scrubber. The combustible gas passes through the scrubber to remove matter such as tar and oil and to undergo preliminary catalytic chemical reactions. The scrubbed gas passes through one or more optional blowers to the fixer. Additional catalytic chemical reactions occur in the fixer and wood chips or other filters may also be used in the fixer to provide a relatively clean, dry, combustible gas. The combustible gas passes through one or more optional blowers to the cyclone, which helps separate additional liquids from the gas. The combustible gas then passes through one or more optional blowers to the demister, which allows additional catalytic reactions to occur and separates additional liquids from the gas. Wastewater, condensate, and other waste products from the scrubber, fixer, cyclone and demister may be captured and returned to the combustor or extracted.

BRIEF DESCRIPTION OF THE DRAWING

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
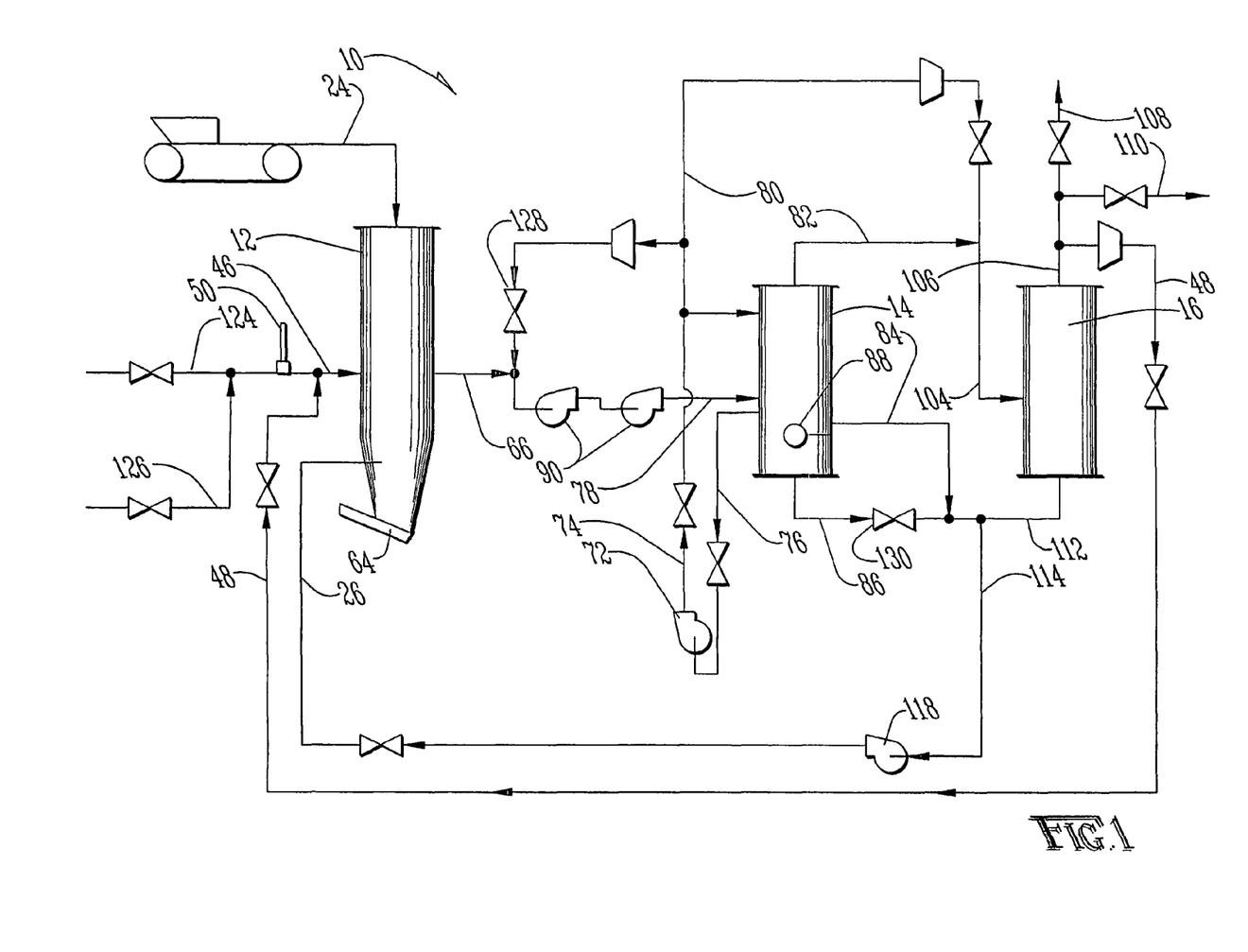
FIG. 1 is a flow diagram of an embodiment of the present invention.
Figure 5:
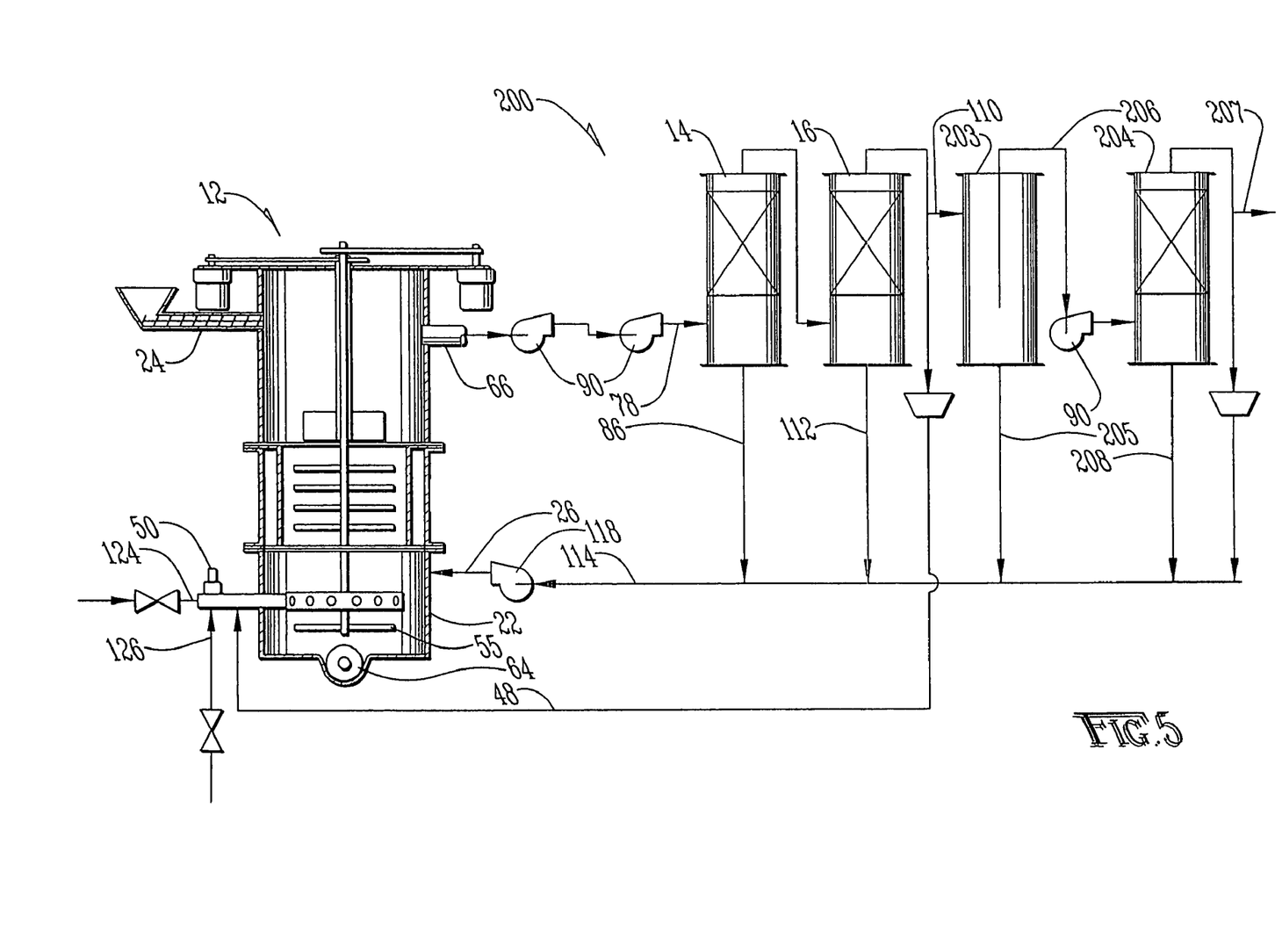
FIG. 5 is a flow diagram of an alternative embodiment of the present invention.

Referring to FIGS. 1 and 5, the reference numerals 10 and 200 refer in general to a gasification system for practicing the present invention. The system 10, 200 typically comprises a combustor 12, an optional scrubber 14, an optional fixer 16, an optional cyclone 203 and an optional demister 204, with one or more optional blowers between these vessels. One or more optional blowers may also be disposed before the first vessel in the system 10, 200 sequence. One or more optional blowers may also be disposed after the last vessel in the system 10, 200 sequence. The system 10, 200 principally consists of preferably the combustor 12 and the fixer 16, more preferably the combustor 12, the scrubber 14 and the fixer 16, more preferably the combustor 12, the scrubber 14, the fixer 16 and the cyclone 203, and most preferably the combustor 12, the scrubber 14, the fixer 16, the cyclone 203 and the demister 204. The combustor 12, the scrubber 14, the fixer 16, the cyclone 203 and the demister 204 may comprise any type of reaction vessel. In the system 10, 200, after the combustor 12, the typical and preferable sequence of vessels, the scrubber 14, the fixer 16, the cyclone 203 and the demister 204, may also be arranged in different sequences.

Referring to FIG. 1, the fuel conduit 24 is disposed to provide a carbonaceous fuel source into an upper portion of combustor 12. The fuel conduit 24 comprises preferably a conveyor, more preferably an auger drive, suitable for the transfer of solid and semi-solid material. The fuel conduit 24 transfers the solid or semisolid carbonaceous fuel into an upper portion of combustor 12.

Figure 2:
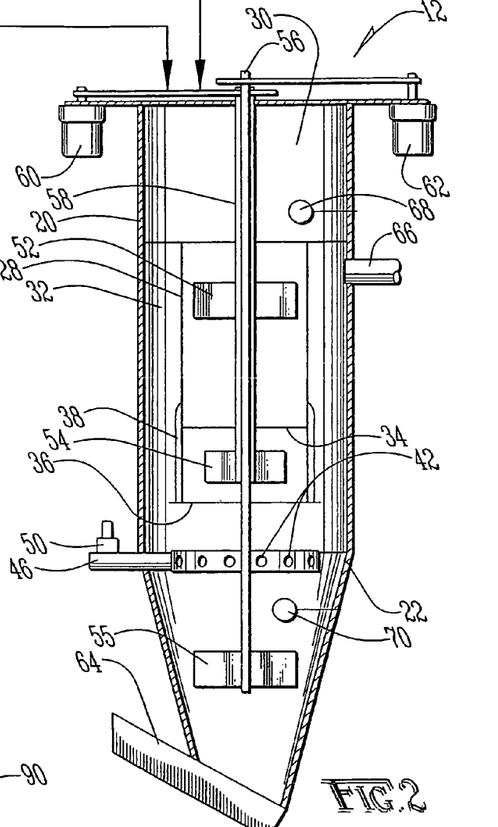
FIG. 2 is a side elevation, schematic view of a combustor for practicing the present invention.

Referring to FIG. 2, the combustor 12 has an upper outer wall portion 20 and a lower base portion 22. The combustor 12 is preferably open, more preferably closed at the top and is preferably configured as a downdraft combustor, more preferably as an updraft combustor. The fuel conduit 24 transfers the solid or semi-solid carbonaceous fuel into an upper portion of combustor 12, preferably into an upper portion of the inner chamber 30, more preferably into an upper portion of the inner chamber 30 above the fuel level sensor 68. Another feed conduit 26 may also be provided to recycle material into the combustor 12 from other portions of the system 10, 200 as discussed in more detail below. Additional feed conduits may also be used, for example, to provide different types of solid, semi-solid and liquid fuel sources. The inner wall 28 is disposed within the combustor 12 and is connected to the combustor 12 to form the inner chamber 30 and the outer chamber 32. A lower portion of the inner wall 28 defines the opening 34. The ash support member 36 is affixed below the inner wall 28, preferably by support members 38, more preferably by affixing portions of the outer periphery of the ash support member 36 to the upper outer wall portion 20, so that the ash support member 36 is disposed a distance below the opening 34. The outer periphery of the ash support member 36 is relatively free from obstructions about the vast majority of the outer periphery, providing relatively open side passageways between the inner wall 28 and the ash support member 36. This allows ash to spill from the ash support member 36 preferably over at least approximately 80 percent of the outer periphery of the ash support member 36, more preferably over at least approximately 90 percent of the outer periphery of the ash support member 36 and most preferably over at least approximately 95 percent of the outer periphery of the ash support member 36.

A conduit or gas manifold 46 extends preferably through the upper outer wall portion 20, more preferably through the lower outer wall portion 22, of the combustor 12, below the ash support member 36. The conduit or gas manifold 46 is connected to an air source and is preferably connected to an auxiliary fuel source, such as a source of natural gas, liquefied petroleum gas (LPG or LP gas), or propane (&He). As seen in FIGS. 1 and 5, a recycle conduit 48 may also be provided to return a portion of the combustible gas generated by the system 10, 200. The igniter 50, such as a spark plug igniter, is preferably disposed in the conduit or gas manifold 46 adjacent to the combustor 12. As depicted in FIG. 5, the most preferably sequence of attachments along the external portion of the conduit or gas manifold 46 is to have the recycle conduit 48 attachment disposed closest to the combustor 12, the igniter 50 disposed further from the combustor 12, the auxiliary fuel conduit 126 disposed an additional further distance from the combustor 12 and the auxiliary air conduit 124 disposed the furthest distance from the combustor 12.

As seen in FIG. 2, one or more fuel agitators such as the fuel stirring member 52 are preferably provided in the inner chamber 30, preferably disposed above the opening 34. Similarly, one or more combustion bed agitators such as the combustion bed stirrer 54 are preferably provided inside the combustor 12, preferably below the opening 34 and above the ash support member 36. One or more ash agitators such as ash stirring member 55 are preferably provided inside the combustor 12, preferably below the ash support member 36, more preferably below both the ash support member 36 and the conduit or gas manifold 46. Coaxial shafts 56 and 58 extend upward from the stirring members 52, 54 and 55 to or above an upper portion of the combustor 12. Motors 60 and 62 are operably connected to the shafts 56 and 58 for rotating the shafts and stirring members 52, 54 and 55.

Hollow shaft 58 is rotated by motor 60 and is preferably connected to both stirring members 52 and 54, more preferably connected to stirring member 52 but not to stirring member 54. Solid shaft 56 is rotated by motor 62 and is preferably connected to stirring member 55 but not to stirring member 54, more preferably connected to both stirring member 54 and stirring member 55. Most preferably, motor 60 is disposed near the top of combustor 12 and rotates a solid shaft replacement for hollow shaft 58 which is operably connected to one or more stirring members 52, while motor 62 is disposed near the bottom of combustor 12 and rotates a separate solid shaft that is operably connected to stirring members 54 and 55.

The preferably frustoconical, more preferably cylindrical, lower base portion 22 of the combustor 12 extends below the ash support member 36. An opening is provided at or near the bottom of the lower base portion 22 to allow ash to pass from the combustor 12 to the ash removal conduit 64. The ash removal conduit 64 preferably comprises an auger drive suitable for solids transfer. A conduit 66 is disposed through the outer wall of the combustor 12 in an upper portion of preferably the outer chamber 32, more preferably the inner chamber 30, to provide a path for combustible gases generated within the combustor 12 to pass from the combustor 12.

A fuel level sensor 68 is provided in the inner chamber 30, preferably above the opening 34, more preferably above both the opening 34 and the fuel agitator 52. The fuel level sensor 68 is operably coupled with the fuel conduit 24 to automate the process of maintaining fuel at a desired level within the inner chamber 30. Additionally, an optional screen is preferably disposed inside an upper portion of the inner chamber 30, between the fuel conduit 24 and the conduit 66. The optional ash level sensor 70 is disposed within the combustor 12, preferably below the ash support member 36, more preferably below both the ash support member 36 and the conduit or gas manifold 46. The optional ash level sensor 70 is operably coupled with the ash removal conduit 64 to automate the process of maintaining ash at a desired level within the combustor 12. Additional optional conduits are preferably provided for extracting gas from combustor 12 for testing and other uses. Additional optional conduits are also preferably provided for extracting liquids from the combustor 12 for testing and other uses. It is understood that the combustor 12 may take any number of sizes, shapes and configurations. It is also understood that the combustor 12 need not be closed at the top and need not be an updraft combustor.

Figure 3:
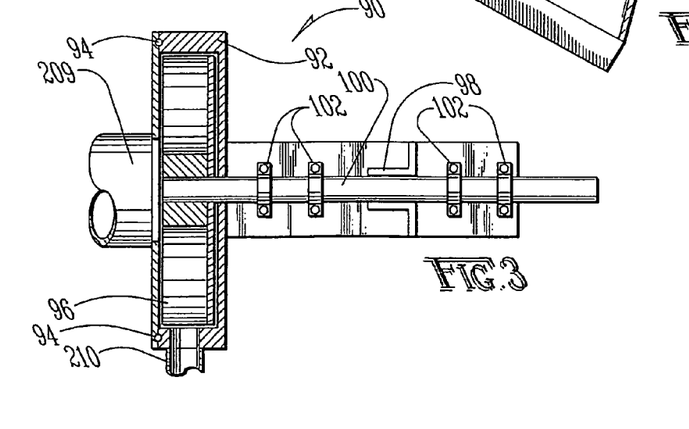
FIG. 3 is an overhead plan cross sectional view of a blower for practicing the present invention.
Figure 4:
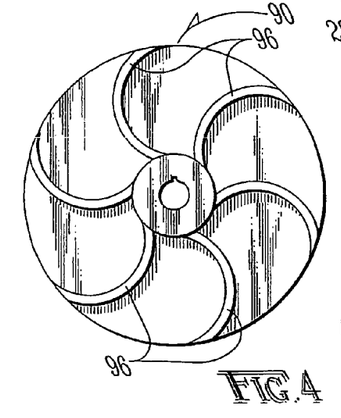
FIG. 4 is a side elevation cross section view showing the impeller blades of the blower of FIG. 3.

Referring to FIGS. 1 and 5, the conduit 66 operably couples the combustor 12 with the scrubber 14, providing a flow path through preferably one or more of the optional blowers 90 into preferably an upper portion, more preferably a lower portion of the scrubber 14. As seen in FIG. 3, the blowers 90 are heavy duty hybrids that combine desirable features of blowers designed for moving gases and pumps designed for moving liquids. The blowers 90 move gases and/or liquids from an inlet 209 to an outlet 210. Walls forming the impeller housing 92 have a wall thickness of preferably approximately 314 inch (2 centimeters), more preferably approximately 518 inch (1.6 centimeters). A sealing member 94, such as a gasket, is used to create an airtight and watertight seal between the walls forming the impeller housing 92. Referring to FIG. 4, the impeller blades 96 are preferably straight, more preferably curved, and are thicker than impeller blades of common blowers designed for moving gases, preferably approximately 50 percent thicker. Referring back to FIG. 3, the mechanical seal 98, similar to a mechanical seal used in a typical centrifugal compressor, is used to provide the impeller shaft 100 seal. Although not preferred, one or more packing glands similar to those found in a typical water pump may be used as substitutes for the mechanical seal 98. Additional sets of the bearings 102 are also preferably used in connection with the impeller shaft 100. It is preferable to use at least two sets of the bearings 102. It is understood that the blowers 90 may be disposed at any number of locations in the system 10, 200 and that the blowers 90 may take any number of different sizes, shapes and configurations. It is also understood that, although not preferred, conventional blowers, pumps, centrifugal compressors or similar devices may be used as substitutes for the blowers 90.

Referring to FIGS. 1 and 5, the scrubber 14 preferably contains one or more filters (including, but not limited to, ferrous or non-ferrous metals, precious metals, ceramics, minerals, liquids, plastics, fibrous or non-fibrous materials, wood chips, organic or inorganic materials, porous or non-porous materials, natural or artificial materials, absorbents or adsorbents, diatomaceous earth, mixtures or combinations of these and other materials, or any other filter known to those skilled in the art). The scrubber 14 more preferably contains one or more filters and one or more catalysts (including, but not limited to, ferrous or non-ferrous metals, precious metals, ceramics, minerals, liquids, plastics, fibrous or non-fibrous materials, wood chips, organic or inorganic materials, porous or non-porous materials, natural or artificial materials, absorbents or adsorbents, diatomaceous earth, mixtures or combinations of these and other materials, or any other catalyst known to those skilled in the art). Most preferably, the scrubber 14 contains catalyst material whose surface has properties of stainless steel. Without limiting the present invention thereto, 304, 304H and 316 types of stainless steel have been found to be effective in the practice of the invention. It is hypothesized that the presence of manganese (Mn) in the stainless steel may be significant in promoting the formation of C4 and higher hydrocarbons and other high heating value compounds. Non-stainless steel, such as mild steel, cold-rolled steel, hot-rolled steel and chrome steel have been found to have poor performance as compared to stainless steel catalysts. Aluminum has been found to be less effective than non-stainless steel and brass to be less effective than aluminum. The catalysts used in the present invention may be of various shapes and sizes and could include other materials, such as ceramic beads, plated with stainless steel.

Referring to FIG. 1, an optional pump 72 is preferably provided to pass liquid, for example water with impurities therein, through a feed conduit 74 into a preferably lower portion, more preferably upper portion, of the scrubber 14 and preferably through sprayers. A liquid return conduit 76 is preferably connected to a lower portion of the scrubber 14 for returning liquid to the optional pump 72 for reuse within the scrubber 14. A feed conduit 78 may also be provided for providing preferably gas from combustor 12, more preferably gas and liquids from combustor 12, most preferably gas and liquids from combustor 12 and recirculated liquid to scrubber 14. Optional wash conduit 80 may be provided for intermittent use to transfer liquid through conduits 66, 82 and 104 for cleaning. Scrubbed gas exits through conduit 82 that is disposed at a preferably lower, more preferably upper portion of the scrubber 14. Additional optional conduits are preferably provided for passing the scrubbed combustible gas to flare, to recycle, for testing and for further uses. Additional optional conduits are also preferably provided for extracting liquids from the scrubber 14 or returning liquids from the scrubber 14 to the combustor 12 for recycling. An optional skim conduit 84 is preferably provided at a lower portion of the scrubber 14 and a drain conduit 86 is provided at the bottom of the scrubber 14. An optional level sensor 88, such as a float switch, is preferably disposed in the scrubber 14 for maintaining liquid levels within the scrubber 14 at desired levels. It is understood that the scrubber 14 may take any number of shapes, sizes and configurations and that any number of different filter media or catalysts or different combinations of filter media and catalysts may be used in the scrubber 14.

Referring to FIG. 1, the conduit 104 connects the scrubber 14 with the fixer 16, providing a flow path through one or more optional blowers 90 into preferably an upper portion, more preferably a lower portion of the fixer 16. The fixer 16 preferably contains one or more filters (including, but not limited to, ferrous or nonferrous metals, precious metals, ceramics, minerals, liquids, plastics, fibrous or nonfibrous materials, wood chips, organic or inorganic materials, porous or non-porous materials, natural or artificial materials, absorbents or adsorbents, diatomaceous earth, mixtures or combinations of these and other materials, or any other filter known to those skilled in the art). The fixer 16 more preferably contains one or more filters and one or more catalysts (including, but not limited to, ferrous or non-ferrous metals, precious metals, ceramics, minerals, liquids, plastics, fibrous or non-fibrous materials, wood chips, organic or inorganic materials, porous or non-porous materials, natural or artificial materials, absorbents or adsorbents, diatomaceous earth, mixtures or combinations of these and other materials, or any other catalyst. known to those skilled in the art). Most preferably, the fixer 16 contains catalyst material whose surface has properties of stainless steel as described above. The conduit 106 passes from preferably a lower portion, more preferably an upper portion, of the fixer 16 to provide a flow path for the scrubbed and fixed combustible gas. The conduits 108, 48 and 110 are preferably provided for passing the scrubbed and fixed combustible gas to flare, to recycle, for testing and for further uses. Additional optional conduits are also preferably provided for extracting liquids from the fixer 16 and returning liquids from the fixer 16 to the combustor 12 for recycling. An optional skim conduit is preferably provided at a lower portion of the fixer 16. The drain conduit 112 passes from a lower portion of the fixer 16 for removing wastewater and other matter that condenses or is removed from the gas as it passes through the fixer 16. An optional level sensor, such as a float switch, is preferably disposed in the fixer 16 for maintaining liquid levels within the fixer 16 at desired levels. It is understood that the fixer 16 may take any number of shapes, sizes and configurations and that any number of different filter media or catalysts or different combinations of filter media and catalysts may be used in fixer 16.

Referring to FIG. 1, the conduits 84, 86 and 112 preferably provide a flow path from the scrubber 14 and fixer 16 into the conduit 114, which leads into the pump 118. Referring to FIG. 5, the conduits 86, 112, 205, 207 and 208 provide a flow path from the scrubber 14, the fixer 16, the cyclone 203 and the demister 204 into the conduit 114 which leads to pump 118. Referring to FIGS. 1 and 5, conduit 26 preferably operably couples the pump 118 with the combustor 12. It is understood that the pump 118 may be disposed at any number of locations in the system 10, 200 and that the pump 118 may take any number of different sizes, shapes and configurations. Liquids may be extracted from conduit 114, conduit 26 and other conduits for testing or use in petrochemical, chemical or other applications.

Referring to FIG. 5, the conduit 110 operably couples the fixer 16 with the cyclone 203, providing a flow path through preferably one or more of the optional blowers 90 into preferably a lower portion, more preferably a tangential upper portion of the cyclone 203. The cyclone 203 preferably contains no filters and no catalysts so as to facilitate rotary gas motion for additional liquid separation. Additional optional conduits are preferably provided for passing combustible gas from the cyclone 203 to flare, to recycle, for testing and for further uses. Additional drain conduit 205 is also preferably provided for extracting liquids from the cyclone 203 and returning liquids from the cyclone 203 to the combustor 12 for recycling. Operably connected from a lower portion of the cyclone 203 to the drain conduit 205 is an optional skim conduit. An optional level sensor, such as a float switch, is preferably disposed in a lower portion of the cyclone 203 for maintaining liquid levels within the cyclone 203 at desired levels. It is understood that the cyclone 203 may take any number of different sizes, shapes and configurations and that any number of different filter media or catalysts or different combinations of filter media and catalysts may be used in the cyclone 203.

Referring to FIG. 5, the conduit 206 is preferably disposed vertically along the center axis of the cyclone 203, opening inside a lower portion of the cyclone 203, exiting the cyclone 203 at the top center of the cyclone 203 and operably coupling the cyclone 203 with the demister 204, providing a flow path through preferably one or more of the optional blowers 90 into preferably an upper portion, more preferably a lower portion of the demister 204. The demister 204 preferably contains one or more filters (including, but not limited to, ferrous or non-ferrous metals, precious metals, ceramics, minerals, liquids, plastics, fibrous or non-fibrous materials, wood chips, organic or inorganic materials, porous or non-porous materials, natural or artificial materials, absorbents or adsorbents, diatomaceous earth, mixtures or combinations of these and other materials, or any other filter known to those skilled in the art). The demister 204 more preferably contains one or more filters and one or more catalysts (including, but not limited to, ferrous or non-ferrous metals, precious metals, ceramics, minerals, liquids, plastics, fibrous or non-fibrous materials, wood chips, organic or inorganic materials, porous or non-porous materials, natural or artificial materials, absorbents or adsorbents, diatomaceous earth, mixtures or combinations of these and other materials, or any other catalyst known to those skilled in the art). Most preferably, the demister 204 contains catalyst material whose surface has properties of stainless steel as described above. Additional optional conduits are preferably provided for passing the demisted combustible gas to flare, to recycle, for testing and for further uses. The drain conduit 208 is also preferably provided for extracting liquids from the demister 204 and returning liquids from the demister 204 to the combustor 12 for recycling. An optional skim conduit is also preferably provided at a lower portion of the demister 204. An optional level sensor, such as a float switch, is preferably disposed in a lower portion of the demister 204 for maintaining liquid levels within the demister 204 at desired levels. It is understood that the demister 204 may take any number of shapes, sizes and configurations and that any number of different filter media or catalysts or different combinations of filter media and catalysts may be used in the demister 204. It is also understood that the sequence of scrubber 14, fixer 16, cyclone 203 and demister 204 may be rearranged to adjust characteristics of the gas and liquids.

In operation, referring to FIG. 1, the fuel conduit 24 provides solid or semi-solid carbonaceous fuel to the combustor 12. Referring to FIG. 2, the solid or semi-solid carbonaceous fuel from the fuel conduit 24 enters an upper portion of the combustor 12, drops through the inner chamber 30, is at least partially combusted, accumulates on the ash support member 36 and builds up within the inner chamber 30 to a level above the fuel stirring member 52. Fuel stirring member 52 agitates and preferably partially levels the carbonaceous fuel. Fuel stirring member 52 also reduces and preferably prevents carbonaceous fuel channeling, bridging, clumping, voids, and similar problems. As seen in FIGS. 1 and 5, an oxygen source, such as air, is provided preferably via auxiliary air conduit 124 and an auxiliary fuel source is provided preferably via auxiliary fuel conduit 126. Referring to FIG. 2, the air and auxiliary fuel are mixed inside conduit or gas manifold 46, ignited by igniter 50 and transferred into the combustor 12 through openings 42. The burning mixture of air and auxiliary fuel heats the carbonaceous fuel within the inner chamber 30. Once measured temperatures within the lower portion of inner chamber 30 exceed preferably at least 120 degrees Celsius (248 degrees Fahrenheit) and preferably no more than 260 degrees Celsius (500 degrees Fahrenheit), it is preferable for the overall efficiency of the system 10, 200 that auxiliary fuel sources be at least partially shut off, the igniter 50 be at least partially shut off and recycled material from other portions of the system 10, 200 entering the combustor 12 be sufficient to continue normal operation. As the carbonaceous fuel passes downward within the inner chamber 30, the carbonaceous fuel sources are at least partially combusted to produce, among other materials, ash and a combustible gas.

Referring to FIG. 2, ash passes through opening 34 and collects on ash support member 36. The combustion bed stirrer 54 prevents excessive ash accumulation by moving the collecting ash preferably outward so that the ash spills or passes from the outer periphery of the ash support member 36, more preferably moving the collecting ash downward so that the ash spills or passes through perforations in ash support member 36, most preferably moving the collecting ash both outward over the outer periphery of ash support member 36 and downward through perforations in ash support member 36 so that the ash falls down to the lower base portion 22 of the combustor 12. Other than the combustion bed stirrer 54 and support members 38, the area between the opening 34 of the inner wall 28 and the top surface of ash support member 36 is substantially unobstructed to provide a ready path for ash removal. The ash support member 36 is affixed below the inner wall 28, preferably by support members 38, more preferably by affixing portions of the outer edge of ash support member 36 to the upper outer wall portion 20 or the lower outer wall portion 22. The ash support member 36 is affixed in a manner that allows ash to spill from the ash support member 36 preferably over at least approximately 70 percent of the outer periphery of the ash support member 36, more preferably over at least approximately 80 percent of the outer periphery of the ash support member 36, and most preferably over at least approximately 90 percent of the outer periphery of the ash support member 36.

Referring to FIG. 2, ash that accumulates in the lower base portion 22 of the combustor 12 passes through an opening in the bottom of the combustor 12 and is removed by the ash removal conduit 64. The ash removal conduit 64 is operably coupled with the optional ash level sensor 70 to maintain the level of ash in the combustor 12 below a desired amount. The ash removed from the combustor 12 is typically a salable product. For example, the ash may be suitable for sale as fertilizer, soil stabilizer, filter material and as an extender for mortar, concrete, or road material, among other uses.

Referring to FIG. 2, the fuel level sensor 68 is operably coupled with the fuel conduit 24 to maintain the level of solid or semi-solid fuel within a desired height range within the inner chamber 30. The desired height range may vary depending upon a number of factors, including, but not limited to, the properties of the solid or semi-solid fuel. It is typically desirable to maintain the solid or semi-solid fuel level within the inner chamber 30 at a level that maintains an adequate partial seal, preferably to help regulate the flow of products of combustion from the combustor 12 through the conduit 66, preferably to facilitate heating of the carbonaceous fuel and preferably to help control the degree of partial combustion within the inner chamber 30. The preferable level may vary with factors such as the density and moisture content of the solid or semi-solid fuel. For example, the preferable level for a solid or semi-solid fuel comprised primarily of chicken litter (including, but not limited to, chicken waste products, absorbents such as rice hulls or wood chips, or any combination of these and similar or related materials), wood pulp or paper mill sludge, or sanding dust or wood dust is approximately 25 inches (approximately 64 centimeters) above the ash support member 36.

Referring to FIG. 1, the optional blowers 90 draw products of combustion preferably downward, more preferably upward, through the combustor 12 so that they pass through the opening 34 in the inner wall 28 and upwardly through preferably the outer chamber 32, more preferably the inner chamber 30 before passing through conduit 66. Material from the combustor 12 travels through conduit 66 and enters preferably an upper portion, more preferably a lower portion, of the scrubber 14. The optional pump 72 preferably circulates liquid, for example water with impurities therein, through the scrubber 14. The circulated liquid cools and scrubs the combustible gas, removing matter from the combustible gas including, but not limited to, tar, oil and particulates. The liquid level in the scrubber 14 is preferably maintained at a level so that tar, oil and similar matter may be removed from the scrubber 14, preferably via the skim conduit 84. Particulates, water and preferably other components that settle to the bottom of the scrubber 14 are removed via the drain conduit 86. The optional valves 128 are also opened preferably intermittently so that the optional pump 72 may circulate liquid through the optional wash conduit 80 and through the conduits 66, 82 and 104 for cleaning. The optional valve 130 may also be opened preferably periodically so that the liquid in the scrubber 14 may be drained through the conduit 86 into conduit 114. Optional filters in the scrubber 14 preferably help remove liquids and particulates from the gas. Catalysts in the scrubber 14 primarily improve the chemical composition of the gas and preferably also help remove liquids and particulates from the gas.

Referring to FIG. 1, the scrubbed combustible gas exits the scrubber 14 through conduit 82 and passes through one or more of the optional blowers 90 into fixer 16. Wastewater and other matter that are removed from the combustible gas and that are not absorbed by the wood chips or other filters fall to the bottom of the fixer 16 and are removed via conduit 112. Optional filters in the fixer 16 preferably help remove liquids and particulates from the gas. Catalysts in the fixer 16 primarily improve the chemical composition of the gas and preferably also help remove liquids and particulates from the gas. Scrubbed, fixed combustible gas exits the fixer 16 via conduit 106. From there the combustible gas is flared via optional conduit 108, returned to the combustor 12 via optional conduit 48, or sent to other uses via optional conduit 110, for example, as shown in FIG. 5, to cyclone 203 and demister 204.

Referring to FIGS. 1 and 5, during the system 10, 200 start-up phase, the combustible gas is flared until it is determined that gas is being produced at a desired quantity and quality. Once the system 10, 200 start-up phase is complete, the combustible gas may be passed via optional conduit 110, 207 to produce work or for further uses elsewhere. For example, the combustible gas may be combusted to supply heat to a process or may be combusted within a motor or turbine to produce work or to generate electricity. As additional examples, the combustible gas produced by the system 10, 200 may be used in brooder heaters in poultry houses, in internal combustion engines, to heat boilers and to provide heat for the production of petroleum substitutes such as methanol.

Referring to FIGS. 1 and 5, depending upon the properties of the carbonaceous fuels being supplied to the combustor 12, such as the moisture content, a portion of the combustible gas is preferably returned to the combustor 12 via conduit 48 and a portion of the liquid is preferably returned to the combustor 12 via conduit 26 to facilitate the partial combustion of the carbonaceous fuel. The returned combustible gas and recycled liquid preferably serve as a complete or partial replacement for the auxiliary fuel source supplied to the combustor 12, particularly after the system 10, 200 start-up phase is complete. Returning a portion of the combustible gas and a portion of the liquid to the combustor 12 tends to reduce the need for auxiliary fuel to maintain the desired partial combustion in the combustor 12 and tends to improve the overall efficiency of typical embodiments of the system 10, 200.

Referring to FIGS. 1 and 5, conduits 86, 84, 112; 205, 207 and 208 connect the scrubber 14, the fixer 16, the cyclone 203 and the demister 204 to the conduit 114, which connects to the pump 118. These conduits 86, 84, 112, 205, 207 and 208 pass wastewater, excess liquid from wet fuel components, tar, oil, particulate matter, condensate, and other removed substances to the conduit 114 which connects to the pump 118. The output of pump 118 is preferably recycled via conduit 26 back into the combustor 12. Returning the wastewater, liquids and other components to the combustor 12 provides a number of advantages. For example, the recycled wastewater tends to scavenge additional, residual carbon from the ash as the liquid is broken down. This recycling of liquid provides for improved recovery of the heating value from the carbonaceous fuel and eliminates or drastically reduces the need to dispose of wastewater. A portion of the liquid may also be extracted from the system 10, 200 for use as, for example, a partial replacement for petroleum or petrochemical products in combustion or chemical applications.

The system 10,200 may be used to process a wide variety of carbonaceous fuels, as well as combinations thereof. The spacing between the ash support member 36 and the opening 34 of the inner wall 28, as well as the relatively unobstructed side openings there, allow a wide assortment of solid or semi-solid fuels to be used with low risk of clogging. Carbonaceous fuels used successfully in one specific embodiment of system 10, 200 include, but are not limited to, materials such as chicken litter, other animal waste, some municipal solid or semi-solid waste, sanding dust from glued woods (such as plywood or pressboard), paper mill or wood pulp sludge (including, but not limited to, sludge with a moisture content of 65% or higher), wood or yard waste, agricultural waste, biomass, shredded tires and mixtures or combinations of these and other carbonaceous materials. Liquid carbonaceous fuels may also be added to the solid or semi-solid carbonaceous fuel, including, but not limited to, waste petroleum products, used motor oil, used cooking oil and carbonaceous liquids extracted from the system 10, 200 itself. Adding such liquid carbonaceous fuels can markedly increase the overall efficiency of typical embodiments of the system 10, 200.

One specific embodiment of the system 10, 200 is approximately 6 feet (1.8 meters) wide, approximately 12 feet (3.7 meters) long and approximately 8 feet (2.4 meters) tall. This specific embodiment of system 10, 200 gasifies approximately eighty (80) pounds (36 kilograms) of chicken litter per hour, requires no auxiliary fuel after start-up, uses approximately ten (10) kilowatt-hours of electricity, and produces approximately ten (10) pounds (4.5 kilograms) per hour of mineral ash, generating no other solid waste, no liquid waste, and essentially no gaseous waste.

The emissions test results in Example 1 below illustrate that at least one specific embodiment of the system 10, 200 can produce combustible gas that is environmentally relatively benign, while processing solid or semi-solid carbonaceous fuels that previously posed serious landfill issues.

EXAMPLE 1

An emissions test was conducted on combustible gas generated by one specific embodiment of the system 10, 200 while combusting chicken litter. A sample run of approximately 60 minutes in duration was performed. Testing was performed in approximate accordance with the methods detailed in 40 Code of Federal Regulations (CFR), Part 60, Appendix A. The flow, based on the lowest recordable flow, had a velocity of approximately 6 feet per second (1.8 meters per second) and the sample collected had a volume of approximately 40 dry standard cubic feet (1000 liters). The results of the emissions testing for Example 1 are summarized in Table 1 below.

TABLE 1

| Substance | Emissions in approximate lbs/hr (grams/hr) |
|---|---|
| Particulate Matter (based on lowest detectable flow rate) | 0.003 (1) |
| VOC as Propane (corrected for moisture) | 0.1 (50) |
| Nitrogen Oxides as NOs | 0.001 (0.5) |
| Carbon Monoxide | 0.003 (1) |
| Sulfur Dioxide | 0.1 (50) |
| Ammonia | 0.03 (10) |
| HCl | 0.008 (4) |
| Chloride | 0.005 (2) |

EXAMPLE 2

An emissions test was conducted on combustible gas generated by one specific embodiment of the system 10, 200 while combusting paper mill sludge. A sample run of approximately 60 minutes in duration was performed. Testing was performed in approximate accordance with the methods detailed in 40 CFR, Part 60, Appendix A. The flow, based on the lowest recordable flow, had a velocity of approximately 6 feet per second (1.8 meters per second) and the sample collected had a volume of approximately 40 dry standard cubic feet (1 000 liters). The results of the emissions testing for Example 2 are summarized in Table 2 below.

TABLE 2

| Substance | Emissions in approximate lbs/hr (grams/hr) |
|---|---|
| Particulate Matter (based on lowest detectable flow rate) | 0.001 (0.5) |
| VOC as Propane (corrected for moisture) | 0.01 (5) |
| Nitrogen Oxides as NO2 | 0.01 (5) |
| Carbon Monoxide | 0.05 (20) |
| Sulfur Dioxide | 0.02 (9) |

Other modifications, changes and substitutions are intended in the foregoing and, in some instances, some features of the invention may be employed without a corresponding use of other features. For example, the configuration of the ash support member 36 may be used in combination with any number of different gasification systems, regardless of whether such systems also use other features of the present invention, and may also find uses in systems other than gasification systems. Similarly, the gaseous return and liquid recycling features of the present invention may be used separately or in combination with any number of different gasification systems, regardless of whether such systems also use other features of the present invention, and may also find uses in systems other than gasification systems. Further, the wood chip filtering or other filters or catalysts of the present invention may be used in combination with any number of different gasification systems, regardless of whether such systems also use other features of the present invention, and may also find uses in systems other than gasification systems. Further still, the design of the blower 90 of the present invention may be used in combination with any number of different gasification systems, regardless of whether such systems also use other features of the present invention, and may also find uses in systems other than gasification systems. Of course, quantitative information is included by way of example only and is not intended as a limitation as to the scope of the invention. Accordingly, it is appropriate that the invention be construed broadly and in a manner consistent with the scope of the invention disclosed.

Although the present invention has been described in considerable detail with reference to certain preferred versions or embodiments thereof, other versions or embodiments are possible. For example, versions or embodiments having different component dimensions, different numbers and placements of blowers, different numbers and placements of vessels, different numbers and placements of stirring members, different combinations of components, different sequences of components, or subsets of these and other differences are possible. Therefore, the spirit and scope of the appended claims should not be limited to the description of the preferred versions or embodiments contained herein.

What is claimed is:

1. A gasification method comprising:
at least partially combusting a carbonaceous fuel in a combustor to produce a combustible gas;
passing said combustible gas through one or more first blowers to drive said combustible gas to one or more first filters;
passing said combustible gas through said one or more first filters to produce a scrubbed gas;
passing said scrubbed gas through said one or more second filters to produce a fixed gas;
passing said fixed gas through one or more third blowers to drive said fixed gas to a rotary member; and
passing said fixed gas through said rotary member to produce a rotated gas.

2. The method of claim 1, further comprising the step of:
combusting said rotated gas.

3. The method of claim 1, further comprising the steps of:
passing said rotated gas through one or more fourth blowers to drive said rotated gas to a demister;
passing said rotated gas through one or more third filters to produce a demisted gas; and
combusting said demisted gas.

4. A gasification method comprising:
providing a carbonaceous fuel for combustion;
stirring said carbonaceous fuel;
at least partially combusting said carbonaceous fuel to produce a combustible gas and ash;
passing said combustible gas through one or more first filters to produce a scrubbed gas;
passing said scrubbed gas through one or more second filters to produce a fixed gas;
passing said fixed gas through a rotary member to produce rotated gas;
passing said rotated gas through one or more third filters to produce a demisted gas; and
combusting said demisted gas.

5. A gasification method comprising:
providing a carbonaceous fuel for combustion;
stirring said carbonaceous fuel;
at least partially combusting said carbonaceous fuel to produce a combustible gas and ash;
passing said combustible gas through one or more first blowers to drive said combustible gas to one or more first filters;
passing said combustible gas through said one or more first filters to product a scrubbed gas;
passing said scrubbed gas through one or more second filters to produce a fixed gas;
passing said fixed gas through one or more third blowers to drive said fixed gas to a rotary member; and
passing said fixed gas through said rotary member to produce a rotated gas.

6. The method of claim 5, further comprising the step of:
combusting said rotated gas.

7. The method of claim 5, further comprising the steps of:
passing said rotated gas through one or more fourth blowers to drive said rotated gas to a demister;
passing said rotated gas through one or more third filters to produce a demisted gas; and
combusting said demisted gas.

* * * * *